United States Patent Office 3,215,832
Patented Nov. 2, 1965

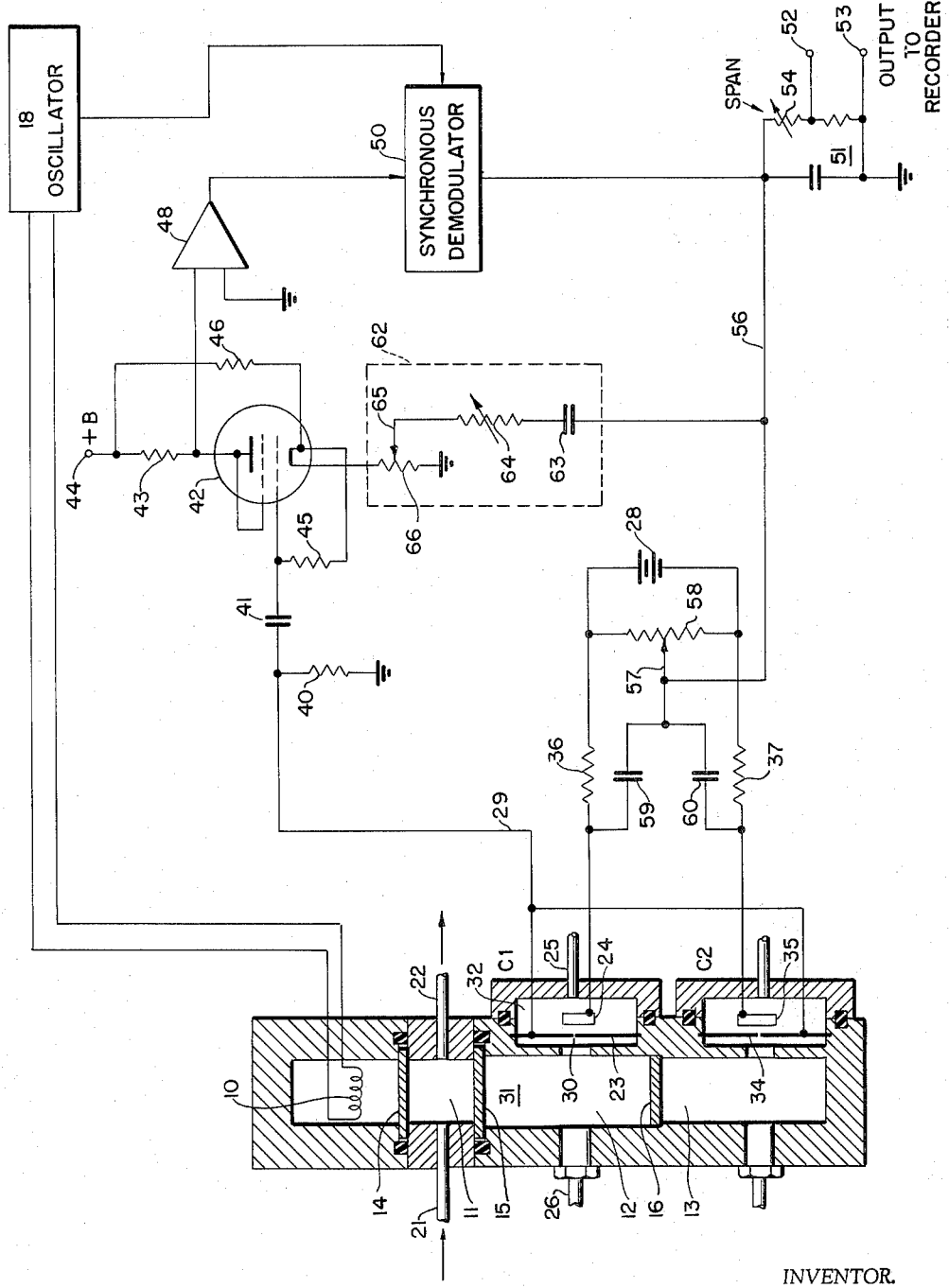

3,215,832
CANCELLATION CIRCUIT FOR NON-DISPERSIVE INFRARED ANALYZER
Raymond L. Madsen, Brea, and Max D. Liston, La Habra, Calif., assignors to Beckman Instruments, Inc., a corporation of California
Filed Oct. 4, 1962, Ser. No. 228,373
5 Claims. (Cl. 250—43.5)

This invention relates to infrared analyzers and more particularly to a cancellation circuit employed in conjunction with the detection circuit of a non-dispersive infrared analyzer.

In positive type infrared analyzers an infrared radiant energy source is arranged such that the radiation therefrom passes through a sample cell containing an unknown substance to be analyzed, and through one or more detector cells. An analyzer of this nature is described in U.S. Patent No. 2,924,713 entitled Instruments by Max D. Liston, and assigned to the same assignee as the present application. The infrared analyzer illustrated in this patent includes a sample cell and two detector cells arranged in optical series. Each of the detector cells has a different charge of gas therein, the difference in the charge being a difference in the partial pressure of the gas of interest or being a different gas. The unknown substance in the sample cell absorbs energy in the infrared spectrum. Each of the detector cells includes a variable capacitor having plates movable relative to each other by changes in the energy of the gas within the respective detector cell, with the energy change within the cell being a function of the change in radiant energy reaching the cell.

An infrared analyzer may utilize D.C. polarizing voltages on the capacitors of both detector cells, with the polarizing voltages connected in opposing polarities to provide signals from the two cells that are combined to provide a resultant signal. An analyzer of this type which employs an over-all feedback loop to obtain a ratio detection system is described in co-pending U.S. patent application of Max D. Liston, et al., entitled Infrared Analyzer, Serial No. 13,932 filed March 9, 1960, now Patent No. 3,130,302, and assigned to the same assignee as the present application.

In the analyzer described in the latter application, a D.C. voltage is employed to bias the capacitors of the detector cells. A D.C. voltage output is obtained from a synchronous demodulator in response to an unbalance in the two detector cell outputs and is applied in series with the D.C. bias voltage to rebalance the detector output. This arrangement results in a synchronous demodulator output voltage which indicates how much the detector is unbalanced, thus giving an indication of the concentration of detectable gases producing that unbalance. Since the detector consists of two capacitor diaphragms which are capable of transmitting A.C. signals in the same manner as fixed coupling capacitors, the resultant signal from the detector capacitors is the sum of the desired signal produced by the infrared detection process and A.C. signals coupled through the detector capacitors from the synchronous demodulator. Although most of the synchronous demodulator output is D.C., a small amount of unwanted A.C. signal does exist. The faster the open loop system response, the greater the magnitude of the A.C. signal at a given frequency. If the undesired A.C. signals are not eliminated, a loop stability problem exists as well as a problem concerning the dynamic range of the system resulting in clipping large A.C. signals that may be generated at the input to an amplifier.

It is a feature of the present invention to provide an infrared analyzer in which the unwanted A.C. signal is utilized in the first stage of an amplifier to cancel the unwanted A.C. signal also applied to the amplifier along with the resultant signal from the detector capacitance.

It is a further feature of the present invention to provide an infrared analyzer in which at least a portion of an unwanted A.C. signal is applied to one electrode of an amplifying device in order to cancel an unwanted A.C. signal applied along with an information signal from a transducer to another electrode of the amplifying device.

It is an additional feature of this invention to provide, in an infrared analyzer, a circuit arrangement for cancelling an unwanted A.C. signal coupled through a detecting transducer of the analyzer.

A further feature of the present invention is the provision, in an electronic transducer system composed of a transducer having an input of sensed information plus a D.C. bias voltage effecting an A.C. voltage output, of a means for eliminating the effect of an unwanted A.C. added to the D.C. bias input comprising a passive A.C. circuit employed in a balance configuration.

According to the present invention, unwanted alternating current signals which are passed by the detector capacitors in an infrared analyzer are canceled by a novel cancellation circuit. As noted previously, the resultant signal from the detector capacitors is the sum of the desired signal produced by the infrared detection process and the A.C. signals coupled through the detector capacitors. The resultant signal is applied to a first electrode of an amplifying device. The output of the amplifying device may be further amplified and applied to a synchronous demodulator. The output of the synchronous demodulator is fed back to the detector capacitor circuit to rebalance the detector output as previously noted, and also provides the output from the analyzer. A cancellation circuit is connected with this feedback circuit and a second electrode of the amplifying device. This cancellation circuit couples the A.C. perturbations at the synchronous demodulator output to the second electrode of the amplifying device to cancel the effect of similar A.C. variations which are transmitted through the detector capacitors to the first electrode of the amplifying device. The cancellation thereby provided in the amplifying device need not be 100 percent complete nor constant with frequency, but the desired cancellation may be achieved in order to provide enough gain and phase margin in the feedback loop including the synchronous demodulator, detector capacitors, amplifying device, etc., and in the feedback loop including the synchronous demodulator, the cancellation circuit, the amplifying device, etc., to provide reliable stable operation.

Other features and objects of the invention will be better understood from a consideration of the following detailed description when read in conjunction with the attached drawing, the single figure of which illustrates an infrared analyzer utilizing a cancellation circuit constructed in accordance wth the teachings of the present invention.

The analyzer illustrated in the drawing includes a radiant energy source 10, a sample cell 11, and detector cells 12 and 13. The cells are arranged in optical series relation and are separated by windows 14, 15 and 16 of quartz or other material having suitable transmission characteristics. The source 10 may be a conventional coil of resistance wire energized from an oscillator 18. If desired, a current amplifier (not shown) may be connected between the oscillator 18 and the source 10. The oscillator preferably is a square wave generator providing pulsed energy and substantially 100 percent modulation to the source.

The sample cell 11 has an inlet 21 and an outlet 22 providing continuous flow of sample therethrough for continuous monitoring of process streams, and the like. Of course, the instrument may also be used for batch measurements if desired.

Means are provided in each detector cell 12 and 13 for determining energy changes occurring therein. Typically, the mechanical movement of a vane or plate may be converted to an electrical signal. In the exemplary embodiment shown herein, a flexible diaphragm 23 is mounted in the detector cell 12 and constitutes one plate of a capacitor C1. Another plate 24 of the capacitor C1 is fixed in place in the cell. Outlets 25 and 26 provide for evacuation and introduction of a new charge of gas in the cell 12. The diaphragm 23 responds to a dynamic volume change in the cell produced by absorption of infrared energy by the gas in the cell. The capacitor C1 is biased by a D.C. voltage source 28, and capacitance variations caused by diaphragm motion are converted to a voltage output on a line 29. The response of the diaphragm is to dynamic volume change, and a small hole 30 in the diaphragm 23 maintains static pressure equilibrium between a main chamber 31 of the detector cell 12 and an associated chamber 32 of the cell.

The detector cell 13 is similar to the cell 12 and has a capacitor C2 with plates 34 and 35. One terminal of the bias voltage source 28 is connected through a resistance 36 to the plate 24 of the capacitor C1, and the opposite terminal of the bias voltage source 28 is connected through a resistance 37 to the plate 35 of the capacitor C2. Thus, the polarity of the voltage applied to the capacitor C2 is opposite to that applied to the capacitor C1 so that the resulting signal appearing on the output line 29 is a function of the difference of the signals from the two capacitors. A resistance 40 is connected from the output line 29 to ground and provides a D.C. path for the bias voltage on the capacitors.

The resultant voltage appearing on the output line 29 is connected through a coupling capacitor 41 to a control grid of a vacuum tube 42. The particular tube shown is for illustrative purposes only, and is a triode connected tetrode CK533AX. The plate of the tube 42 is connected through a resistance 43 to a terminal 44 which is connected to a source of positive voltage (not shown). The cathode of the tube 42 is connected through a resistance 45 to the control grid, and through a resistance 46 to the terminal 44.

The plate of the tube 42 is connected to an amplifier 48 which may be constructed of solid-state devices. The tube 42, which functions as a preamplifier, and the amplifier 48 serve to amplify the signals coupled through the capacitor 41 and to apply the amplified signals to a synchronous demodulator 50. The output from the oscillator 18 also is connected to the synchronous demodulator 50 as a reference signal. The output of the synchronous demodulator 50 is applied through an R-C network 51 to output terminals 52 and 53 which may be connected to a recorder. A resistance 54 in the R-C network 51 may be adjusted to control the span of the recorder.

The output from the synchronous demodulator 50 also is applied through a line 56 to a variable tap 57 of a potentiometer 58 in negative feedback relation. The potentiometer 58 is connected across the voltage source 28. The variable tap 57 on the potentiometer 58 may be changed to serve as a zero adjustment. This tap 57 also is connected through a capacitor 59 to the plate 24 of the capacitor C1, and through a capacitor 60 to the plate 35 of the capacitor C2. The capacitors 59 and 60, and the resistances 36 and 37 serve as a filter circuit for filtering the bias voltage when a rectified A.C. supply is employed at 28. If the source 28 is a battery as shown or a well filtered supply, the capacitors 59 and 60, and the resistors 36 and 37 are not needed.

The arrangement thus far described is similar to the infrared analyzer disclosed in the above-mentioned U.S. patent application, Serial No. 13,932, now Patent No. 3,130,302. In a typical operation of the analyzer thus far described, the first detector cell 12 is charged with CO, the gas to be analyzed for, and the second detector cell 13 is charged with $N_2O$, a gas that is inert or non-absorptive at wavelengths where the gas of interest is absorptive. With the sample cell empty or with an inert gas passing therethrough, the source 10 is pulsed at a low rate and the output of the analyzer is adjusted for zero by the potentiometer 58. The pulsations of the source cause time-varying signals at the capacitors C1 and C2, which signals are approximately 180 degrees out of phase. The particular oscillation frequency for energizing the source 10 is not critical and is determined primarily by the thermal response time of the infrared source.

Subsequently, the sample to be analyzed is passed through the sample cell 11 and when CO gas is present in the sample, infrared energy is absorbed in the sample cell rather than in the first detector cell. This change in the amount of energy absorbed results in a relative change in the time-varying changes of the two capacitors and, hence, an output on the output line 29. This output is a measure of the quantity of CO, sometimes referred to as the unknown substance, in the sample passing through the sample cell 11. This output signal is amplified by the preamplifier tube 42 and the amplifier 48, detected by means of the synchronous demodulator 50 and applied through the R-C network 51 and output terminals 52 and 53 to a recorder. As noted previously, the bias source 28 is employed to bias the capacitors C1 and C2, and the output from the synchronous demodulator 50 is applied in series with this bias voltage to rebalance the detector output. This action results in a synchronous demodulator output voltage which indicates how much the detector is unbalanced, thus giving an indication as to the concentration of the unknown gas or gases producing that unbalance.

Since the detector utilizes two capacitor diaphragms which are capable of transmitting A.C. signals in the same manner as coupling capacitors, the signal on the line 29 is therefore the sum of the desired signal produced by the infrared detection process and the undesired A.C. signals coupled through the detector from the synchronous demodulator 50. Although most of the synchronous demodulator output is D.C., the simple R-C filter 51 allows a small amount of unwanted A.C. signal to exist. The faster the open loop system response, the greater the magnitude of an A.C. signal at a given frequency. There are two feedback loops to consider. The A.C. loop just discussed, and the desired system loop which employs the detector as a transducer to convert its capacitance variations and voltage bias into an A.C. signal. The desired system loop must permit changes in the synchronous demodulator output in a given amount of time to obtain the desired closed loop system response time. A filter may be employed to filter the undesired A.C. signals which are transmitted through the detector, but such an arrangement would maximize (or increase) response time of the system. If the A.C. signals are not eliminated, a loop stability problem exists for the unwanted loop (A.C. signals) as well as a problem concerning the dynamic range of the system resulting in clipping large A.C. signals that may be generated at the input to the preamplifier.

According to a feature of the present invention, a substantially equal and opposite A.C. signal corresponding to the unwanted A.C. signal is applied to one electrode of the preamplifier to cancel the unwanted A.C. signal which is applied along with the desired signal to another electrode of the preamplifier. This may be accomplished where a tube, such as the tube 42 shown in the drawing, is used by introducing at the cathode of the preamplifier a signal substantially equal and opposite to the unwanted A.C. signal applied to the grid of the tube. In this manner the grid-to-cathode voltage of the tube may be made zero. For a high plate resistance pentode type of tube, the plate circuit will then see no change for there will be no current change in the plate load resistor. For a low plate resistance triode, the change introduced at the cathode appears at the plate. However, although the grid and cathode voltages are not adjusted equally in this latter type tube, they are sufficiently different to effect the desired cancellation. If desired, a transistor input amplifier stage may be employed instead of the tube 42. For example, a common emitter transistor amplifier may be used with appropriate bias supplies such that the base substitutes for the grid, emitter for the cathode, and collector for the plate. The tube illustrated was chosen for its high input impedance and low noise characteristics.

Referring again to the drawing, an exemplary cancellation circuit 62 is connected between the feedback line 56 from the synchronous demodulator 50 and the cathode of the tube 42. The cancellation circuit 62 includes a capacitance 63 and a variable resistance 64 connected to a tap 65 on a potentiometer 66. One leg of the potentiometer 66 is grounded, and the other leg is connected with the cathode of the tube 42. With the particular tube 42 illustrated, the cathode is directly heated.

By adjusting the potentiometer 66, the magnitude of the A.C. signal at the cathode of the tube 42 may be varied. A simple R-C circuit is formed by that part of the potentiometer 66 connected in series with the resistance 64 and the capacitor 63. By adjusting the resistance 64, the frequency transmission characteristic of this R-C circuit is controlled. The cancellation circuit 62 couples the A.C. variations from the output of the synchronous demodulator 50 to the cathode of the tube 42 to cancel the effect of the same A.C. variations which are transmitted through the detector capacitors to the control grid of the tube 42. As noted above, the cancellation in the plate circuit of the tube 42 need not be entirely complete nor constant with frequency, but the cancellation achieved need only be sufficient to provide enough gain and phase margin in the feedback loop including the detector capacitors and in the feedback loop including the cancellation circuit 62 to produce reliable and stable operation.

If desired, reference may be made to the previously noted co-pending U.S. patent application, Serial No. 13,932, now Patent No. 3,130,302, for further discussion of the conventional components illustrated in the attached drawing. It is to be understood that although a specific vacuum tube has been illustrated for the tube 42, other tubes or solid-state devices may be employed. As noted previously, a triode connected tetrode CK533AX has been found suitable for the tube 42. Additionally, suitable values for the exemplary components used in conjunction with this type tube are:

Resistance 40 ---------------- $10^{10}$ ohms.
Capacitance 41 --------------- 100 picofarads.
Resistance 43 ---------------- 100 megohms.
Resistance 45 ---------------- $10^{11}$ ohms.
Resistance 46 ---------------- 1.3K ohms.
Capacitance 63 --------------- 500 microfarads.
Resistance 64 ---------------- 250 ohms (adjustable).
Potentiometer 66 ------------- 1K ohm.
B+ --------------------------- 22 volts.

It now should be apparent that the present invention provides a circuit arrangement which may be employed in conjunction with an infrared analyzer for cancelling unwanted A.C. signals coupled through a transducer to an amplifier by transmitting a certain amount of the unwanted A.C. signals to the amplifier with the proper phase and amplitude such that no unwanted A.C. signal appears at the output of the amplifier.

Although particular components, etc., have been discussed in connection with a specific embodiment of an analyzer constructed in accordance with the teachings of the present invention, others may be utilized. Furthermore, it will be understood that although an exemplary embodiment of the present invention has been disclosed and discussed, other applications and circuit arrangements are possible and that the embodiments disclosed may be subjected to various changes, modifications and substitutions without necessarily departing from the spirit of the invention.

What is claimed is:

1. In an infrared analyzer, a radiant energy source, first means for enrgizing said source, a sample cell and at least a first detector cell mounted in optical series for radiation from said source, said detector cell including a capacitive transducer, a bias voltage source connected with said transducer, said transducer providing an output signal which is a function of energy changes within said detector cell, means coupling the output of said transducer to an amplifying means and means coupling the output of said amplifying means to a demodulator means, a feedback circuit coupled from said demodulator means to said bias voltage source, said transducer coupling unwanted A.C. signals to the input of said amplifying means from said demodulator means, the improvement comprising a passive A.C. circuit coupled from the output of said demodulator means to said amplifying means to couple A.C. signals of a proper phase and magnitude to said amplifying means whereby the output of said amplifying means is substantially devoid of any unwanted A.C. signals.

2. An infrared analyzer as in claim 1 wherein
said amplifying means includes an amplifying device having at least two electrodes,
the output of said transducer is connected to a first of said electrodes, and
said passive A.C. circuit is connected to a second of said electrodes whereby cancellation of said unwanted A.C. signals occurs in said amplifying device.

3. An infrared analyzer as in claim 2 wherein
said amplifying device is a vacuum tube having an anode, a cathode and a control grid,
said first electrode being said control grid, and
said second electrode being said cathode whereby said unwanted A.C. signals applied to said cathode tend to cancel the unwanted A.C. signals applied to said grid.

4. In a positive type infrared analyzer, the combination of a radiant energy source in the form of a filament, means coupled to said filament for cyclically heating said filament, a sample cell and first and second detector cells mounted in optical series for radiation from said source with said sample cell preceding said first detector cell, each of said detector cells having means for detecting energy changes occurring therein for producing first and second signals, means for combining said signals to produce a resultant signal, an amplifier having said resultant signal as an input, and a demodulator having the output of said amplifier as an input and producing an output which is a measure of the unknown substance in the sample, a feedback circuit coupled from said demodulator to said means for detecting energy changes, the output of said demodulator including unwanted A.C. signals which are coupled through said means for detecting energy changes to said amplifier, the improvement comprising an R-C circuit coupled from the output of said demodulator to said amplifier to apply a portion of said unwanted A.C. signals in an opposing relationship to the unwanted A.C. signals coupled through said means for detecting energy changes to said amplifier within said amplifier for cancelling said A.C. signals.

5. A positive type infrared analyzer as in claim 4 wherein
said amplifier includes an amplifying device having at least two electrodes,
said means for detecting energy changes being coupled with a first of said electrodes,
said R-C circuit including a variable resistance and being coupled with a second of said electrodes, whereby unwanted A.C. signals may be applied to said second electrode to tend to cancel those A.C. signals coupled to said first electrode.

References Cited by the Examiner
UNITED STATES PATENTS 2,469,852  5/49  Strutt et al. _____ 250—214
2,499,996  3/50  Kelsey _____ 250—214
2,918,583  12/59 Kalmus et al. _____ 250—214
2,924,713  2/60  Liston _____ 250—43.5
2,945,131  7/60  Astheimer _____ 250—214

RALPH G. NILSON, *Primary Examiner.*
ARCHIE R. BORCHELT, *Examiner.*